(12) United States Patent
Swift et al.

(10) Patent No.: US 8,592,043 B2
(45) Date of Patent: Nov. 26, 2013

(54) COMPOSITE CONTAINING POLYMER, FILLER AND METAL PLATING CATALYST, METHOD OF MAKING SAME, AND ARTICLE MANUFACTURED THEREFROM

(71) Applicant: Xerox Corporation, Norwalk, CT (US)

(72) Inventors: Joseph A Swift, Dolgeville, NY (US); Stanley J Wallace, Victor, NY (US); Roger L Bullock, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/723,704

(22) Filed: Dec. 21, 2012

(65) Prior Publication Data

US 2013/0122202 A1    May 16, 2013

Related U.S. Application Data

(62) Division of application No. 12/331,589, filed on Dec. 10, 2008, now Pat. No. 8,383,243.

(51) Int. Cl.
*B32B 15/08*  (2006.01)
*C08L 31/06*  (2006.01)

(52) U.S. Cl.
USPC ........... 428/461; 524/559; 524/568; 524/570; 524/588; 524/589; 524/606; 524/577; 524/609

(58) Field of Classification Search
USPC .......... 428/461; 524/559, 568, 570, 588, 589, 524/606, 577, 609
See application file for complete search history.

(56) References Cited

U.S. PATENT DOCUMENTS

| | | |
|---|---|---|
| 3,772,161 A | 11/1973 | Bogard et al. |
| 3,896,252 A | 7/1975 | Tuttle |
| 4,148,945 A | 4/1979 | Bangs et al. |
| 4,520,046 A | 5/1985 | McCaskie et al. |
| 4,552,626 A | 11/1985 | Stevenson |
| 4,701,351 A | 10/1987 | Jackson |
| 4,981,715 A | 1/1991 | Hirsch et al. |
| 5,153,023 A | 10/1992 | Orlowski et al. |
| 5,182,145 A | 1/1993 | Kato |
| 5,288,313 A | 2/1994 | Portner |
| 5,324,766 A | 6/1994 | Ikejiri et al. |
| 5,462,773 A | 10/1995 | Swift et al. |
| 5,500,315 A | 3/1996 | Calvert et al. |
| 6,027,817 A | 2/2000 | Otsuki et al. |
| 6,156,218 A | 12/2000 | Okubo et al. |
| 6,174,647 B1 | 1/2001 | Cahalen et al. |
| 6,458,196 B2 | 10/2002 | Kaneyoshi et al. |
| 6,761,793 B2 | 7/2004 | Murano |
| 7,026,716 B2 | 4/2006 | Ramanath et al. |
| 2006/0188734 A1 | 8/2006 | Valentage et al. |

FOREIGN PATENT DOCUMENTS

| | | |
|---|---|---|
| EP | 0 690 098 | 2/2003 |
| JP | 08-059984 | 3/1996 |
| WO | WO 01/05518 | 1/2001 |
| WO | WO 2004/022815 | 3/2004 |
| WO | WO 2006/052253 | 5/2006 |

OTHER PUBLICATIONS

"Plating on Plastics. Substrates and processes, state-of-the-art and future developments" Mariola Brandes, Atotech Deutschland GmbH, Berlin, 3pp., (not dated).
"Plating Difficult Substrates with Electroless Nickel", David Crotty et al. of MacDermid, Inc., www.pfonline.com, 5 pp., printed Sep. 23, 2008.
"A New Activation Method for Electroless Metal Plating: Palladium Laden via Bonding with Self-Assembly Monolayers", Li Na Xu et al., Chinese Chemical Letters, vol. 13, No. 7.
"Technology from the World Leader in Plating on Plastics", www.atotech.com, 4 pp., printed Sep. 23, 2008.
"Ionic Polymer-Metal Composites", Sia Nemat-Nasser, 4 pp., (not dated).
Heloxy Modifier 67, Product Data Sheet, Hexion Specialty Chemicals, 5 pp., 2006.
Epon Resin 862, Technical Data Sheet, Hexion Specialty Chemicals, 6pp., 2005.
Epovex—Zyvex Performance Materials, www.zyvexpro.com, 3pp., printed Sep. 16, 2008.
Epovex next generation epoxy, Technical Data Sheets for ZS-250 and ZS-350 Carbon Nanotube Enhanced Liquid Epoxy Resins, 8pp., 2008.

*Primary Examiner* — Robert D. Harlan
(74) *Attorney, Agent, or Firm* — Alix, Yale & Ristas, LLP

(57) ABSTRACT

Disclosed herein is a component comprising a substantially homogeneous composition of at least one polymer selected from the group consisting of epoxies, acetals, polyesters, non-ionic rubbers, non-ionic polyurethanes, polyether sulfones, polyether ether ketones, polyether imides, polystyrenes, polyethylene terephthalates, polyamides, polyimides, polyvinylchlorides, polyphenylene oxides, polycarbonates, acrylonitrile-butadiene-styrene terpolymers, silicones, fluropolymers, and polyolefins, a filler, and a metal plating catalyst. A method of making a component also is described comprising obtaining a polymeric material, a liquid, a filler and a metal plating catalyst; combining the metal plating catalyst with the polymeric material, liquid, and filler to form a substantially homogeneous mixture; and evaporating and/or curing the mixture to form a solidified component. The method is useful for making small, precisely engineered, electronic components without requiring the use of caustic solutions or complex equipment.

20 Claims, 9 Drawing Sheets

COMPOSITE CONTAINING POLYMER, FILLER AND METAL PLATING CATALYST, METHOD OF MAKING SAME, AND ARTICLE MANUFACTURED THEREFROM

This is a divisional of U.S. application Ser. No. 12/331,589 filed Dec. 10, 2008.

BACKGROUND

Processes for the metal plating of polymers are known. U.S. Pat. No. 3,556,955 describes a process in which a polymer is conditioned with a strong acid such as sulfuric acid, sensitized in a solution of a reducing agent such as stannous chloride, activated by immersion in a noble metal salt solution and then placed in an electroless plating bath. A metal plating process is described in U.S. Pat. No. 3,896,252 in which a rubber modified unsaturated carboxylic acid or anhydride is contacted with a solution of ethylenediamine or 1,3-diaminopropane in an inert organic solvent that optionally also includes water in order to aminate the surface. Subsequently, a noble metal salt is added, followed by a reducing agent resulting in a metallized surface that can be metal plated using conventional techniques. U.S. Pat. No. 5,500,315 describes an electroless metal plating process using chemical etching to roughen a surface in order to chemically bond chemical groups to the surface that are capable of ligating with a metallic catalyst such as palladium.

A method of surface treating a substrate with a metal catalyst prior to plating is described in commonly assigned U.S. Pat. No. 5,153,023. The catalyst is dissolved in a solvent that does not dissolve or tackify the substrate, and the solution is coated on the substrate and dried. The coated substrate is heated to anchor the catalyst to the substrate surface. Commonly assigned U.S. Pat. No. 5,462,773 describes a method of preparing a polymeric substrate for metal plating by depositing an atomized stream of a precursor of a catalyst on the surface of a softened thermoplastic substrate and heating the deposited precursor to a temperature sufficient to decompose the catalyst, enabling the catalyst to penetrate the surface of the thermoplastic and become anchored in the substrate. Each of these earlier techniques involves treating the surface of a substrate to facilitate the adhesion of a metal plate layer thereon.

Components are commercially available that have substrates made of unfilled or, in some cases, lightly filled polymers with some or all of their surfaces coated in metal by electroless plating or electrolytic plating processes. In general, it has been found that certain unfilled polymers, such as acrylonitrile/butadiene/styrene (ABS), polycarbonates, polyimides, polyethersulfones, and the like, can be surface treated or otherwise pre-processed to electroless metal plate quite effectively. However, if a polymer contains a high load of filler material, problems with adhesion of the metal to the composite result when efforts are made to metal plate the composite. At least in part this is due to the manner in which the various components in the composite respond to the various plating processes. In the cases where the filler or fillers tend to populate the surface and thereby represent a disproportionately larger portion of the surface's composition when compared to the bulk composition, effectiveness of metal plating process may be affected to the point where the process simply does not work or the adhesion of the metal to the composite is compromised to the point where serious degradation to the utility of the plated polymer results. It would be useful to develop metal plated filled polymers having good adhesion of the metal plate layer or layers, as well as effective methods for their production.

SUMMARY

According to aspects illustrated herein, there is provided a component comprising a substantially homogeneous composition of at least one polymer selected from the group consisting of epoxies, acetals, polyesters, non-ionic rubbers, non-ionic polyurethanes, polyether sulfones, polyether ether ketones, polyether imides, polystyrenes, polyethylene terephthalates (PETs), polyamides, polyimides, polyvinylchlorides, polyphenylene oxides, polycarbonates, acrylonitrile-butadiene-styrene terpolymers (ABS), silicones, fluoropolymers and polyolefins, a filler, and a metal plating catalyst.

A further embodiment is a component comprising a substrate having a plated metal layer formed thereon, the substrate comprising a substantially homogeneous composition of at least one polymer selected from the group consisting of epoxies, acetals, polyesters, non-ionic rubbers, non-ionic polyurethanes, polyether sulfones, polyether ether ketones, polyether imides, polystyrenes, polyethylene terephthalates polyamides, polyimides, polyvinylchlorides, polyphenylene oxides, polycarbonates, acrylonitrile-butadiene-styrene terpolymers, silicones and polyolefins, a filler, and a metal plating catalyst.

Another embodiment is a component comprising a substantially homogeneous composition of an epoxy, a filler comprising at least one member selected from the group consisting of carbon fibers, carbon filaments, carbon nanotubes fibers, carbon nanotube filaments and fiberglass fibers, and a metal plating catalyst.

Another disclosed feature of the embodiments is a method of making a component comprising obtaining a polymeric material, a liquid, a filler and a metal plating catalyst; combining the metal plating catalyst with the polymeric material, liquid and filler to form a substantially homogeneous mixture, and curing or evaporating the mixture to form a solidified component. A further aspect illustrated herein is a method of making a component comprising obtaining an epoxy, a crosslinking agent, a carbon filler, a metal plating catalyst, and a liquid comprising at least one of a solvent and a diluent; combining the metal plating catalyst with the epoxy, crosslinking agent, filler and liquid to form a component mixture; and curing the component mixture to form the component. The metal plating catalyst is present throughout the bulk composition of the cured component.

DETAILED DESCRIPTION

Figure 1:
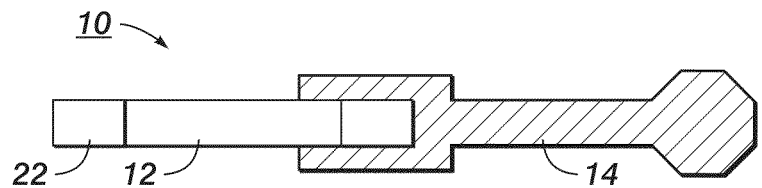
FIG. 1 shows a metal plated electrical component according to one embodiment.

A new composition of matter and a related method are provided for use in forming composite substrates that can be used to produce metal plated polymeric components. The composition results in good adhesion of a subsequently applied metal plate layer even when the substrate contains a high level of one or more fillers. Safe, relatively low cost chemicals are used in the process of combining the metal plating catalyst with the composite. The method of making the composite substrates does not use caustic solutions or complex equipment, and is useful for producing metallized layers of varying thicknesses on components of various sizes, including relatively thick metal layers intended to improve durability of an article, as well as thin-film layers for components that are small and are engineered to very precise specifications. In contrast to conventional methods that treat the surface of the polymeric substrate, the method described herein controls the bulk composition of the substrate to provide for adhesion of a metal layer on the substrate surface.

As used herein, the term "composite" refers to a polymer combined with at least one filler and a metal plating catalyst. The filler concentration in the resin may be at a loading of 0.5 parts by weight (which is also referred to throughout this document as percent by weight and weight percent) or more. A "substantially homogeneous composition" as used herein is one in which all of the constituents are essentially uniformly dispersed in the material. A "filler" as used herein is a material or mix of materials such as particles, spires, shards, platelets, tubes, fibrils, fibers, or filaments that can have any appropriate dimension(s) and can be combined with the polymer, which is also referred to as a resin or binder resin, to form a composite. The fillers do not dissolve in the solvents that are used. In many cases, the fillers do not copolymerize with the polymer. The term "functionalized filler" refers to a filler material as described above that may react or copolymerize with the elements of the composite. As used herein, a "polymeric material" is a polymer or a polymeric precursor that forms a polymer upon curing or evaporation. In some cases, the polymeric material will be present in a liquid when it is obtained and a separate liquid will therefore not always need to be added.

As used herein, a "metal plating catalyst" refers to a metal containing species that is dispersed through the substrate material and provides nucleation sites for metals that are subsequently plated on the substrate, or otherwise serves to speed the process of plating a metal on the substrate and/or increase adhesion of a metal plate layer to the substrate relative to a component that does not contain a metal plating catalyst but is otherwise identical. As used in this document, "electroless plating" refers to the metal deposition of a layer without any external electrical current being applied. "Electroplating" refers to a plating method in which an ionic metal is supplied with electrons to form a non-ionic coating on a substrate. As used in this document the terms fiber and filament are intended to indicate metal, polymer, glass, and ceramic thread-like structures which include synthetic, polymer-based, thread-like, monofilamentary structures including composite fibers such as carbon-filled polymers and natural fiber such as silk or cotton thread like structures. A "filament" as used herein is a substantially continuous fiber.

While not intending to be bound by any particular theory, it is believed that the embodiments described herein provide a sufficient level of a suitable metal, often introduced in the form of an inorganic salt such as but not limited to an ionic salt such as $PdCl_2$, or an organic salt such as but not limited to palladium acetate, on the surface of the resultant composite that can catalyze the reduction of a plateable metal in an electroless metal deposition process or enhance the adhesion of a plateable metal in an electrolytic metal deposition process. The sites where trace quantities of metal exist on the surface of the composite serve as not only seed points but also as mechanical anchor points for the growth of metal atom layers from the plating process. Thus by the presence of active sites throughout the surface, the plated metal atoms are well adhered to the surface. The embodiments described herein can be used separately or in combinations to enable high volume production of metal plated composites have strong adhesion of the metal plated layer. The composites can have various end uses.

Various processes can be used- to plate filled polymers in accordance with the embodiments described herein. In some cases, small amounts of noble metal salts are at least slightly soluble and/or dispersible in at least one of the ingredient polymers and can be added in trace quantities of, for example, 0.01-5000 ppm, to the catalyzed binder resin and optionally as a solution coating to the surface of at least one filler, such as to the surface of the resistive carbon fibers or carbon nanoparticles, thereby serving as a catalyst for the electroless deposition of metal directly onto the exposed surface of the composite and/or onto the filler(s). While not being bound to any particular theory, trace amounts of water that may be absorbed and/or adsorbed within the polymer may be at least in part responsible for the solubility of the metal plating catalyst in the polymers. In some cases, the method involves the use of a multiple solvent system to serve as a common solvent for an inorganic $PdCl_2$ salt, an epoxy binder resin and a curing agent, which are otherwise nearly, if not completely, mutually insoluble and difficult to combine.

Figure 2:
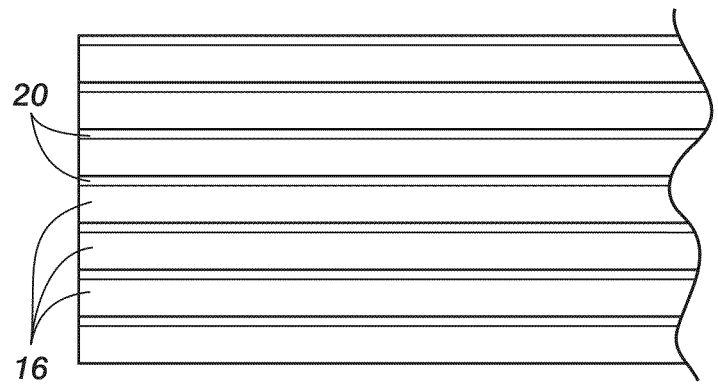
FIG. 2 schematically shows further detail of the construction of the electrical component shown in FIG. 1.
Figure 3:
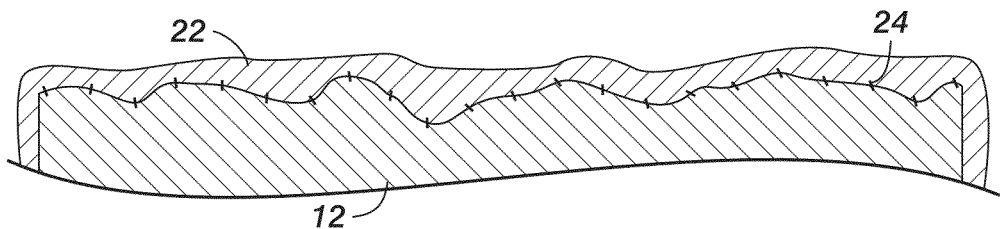
FIG. 3 schematically shows the bonding of the metal layer to the substrate for the component of FIG. 1.

Referring to FIGS. 1, 2, and 3, one type of composite component, an electrical component, is shown and is generally designated as 10. The component includes a fiber-filled composite polymeric round shaped rod-member 12 in a mounting 14, which is shown in cross section. A metal plated layer 22 is formed on each end of the rod 12. The rod 12 contains a plurality of aligned filler fibers 16, shown in FIG.

2 (without the metal plating), held together by a binder 20. The metal plating is held on the surface of the rod though a small number of anchor sites 24, schematically shown in FIG. 3, involving the metal plating catalyst.

One end use of a component having the construction shown in FIG. 1-3 is as an electrical or electronic instrument probe, for example an oscilloscope probe tip that may be formed from a composite comprising a high loading (i.e. in the range of >90% by wgt.) of a resistive carbon fiber (r-fiber), a sufficient amount (i.e. in the range of 2 to 10%) of binder resin, a suitable crosslinking agent, and a suitable metal plating catalyst. The composition is then converted into a solid round rod or other desired configuration by a pultrusion process that employs heat and pressure in a continuous process to shape and solidify the configuration during which time the binder resin is crosslink cured. The components used to form the composite are as shown below:

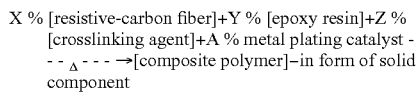

X % [resistive-carbon fiber]+Y % [epoxy resin]+Z % [crosslinking agent]+A % metal plating catalyst -
- - Δ - - - →[composite polymer]–in form of solid component The metal plating catalyst is present and uniformly dispersed throughout the bulk of the polymer phase of the substrate, however without being bound to any particular theory, the part of the catalyst that actually participates in the plating process is believed to be the part that is on and near the outer macroscopic surface of the substrate, herein referred to as the "outer surface" of the substrate," and includes exposed surfaces such as those that can occur within pores, fissures, crevices, and other irregularities that can reside as microscopic surfaces upon or within the macroscopic externalmost surface. Since the metal plating catalyst is present throughout the bulk of the composition, any new surface that is created by cutting or milling for example will result in a new surface containing a critical concentration of the catalyst thereby rendering the new surface immediately compatible with electroless plating processes. The concentration of catalyst that appears on the new surface, or any surface for that matter, is governed by the concentration that exists in the bulk composition which is determined and controlled at the point of manufacture of the composite. In general, since the metal plating catalyst may be relatively expensive and may be the cause of some unwanted effects, such as for example a slight weakening of the strength or perhaps a discoloration of the resultant composite, it is suggested that the concentration of metal plating catalyst employed be adjusted to the lowest level possible to yield the desired level of plating layer adhesion.

When a "low contact resistance" component is being made for use in an instrument probe, the metal plated layer(s) serves as the point(s) of contact between the probe and device under test. Devices of this type typically are formed from rods having very small cross sectional diameters and may have a tapered diameter or other shape to form at least one point-shaped end (not shown). Thus the total quantity of plating metal on the end of the rod may be very small.

Non-limiting examples of filler fibers and filaments to be used are filled or unfilled textile fibers or filaments such as polyester and nylon composites containing appropriate conductive fillers such as carbon black, carbon nanotubes, quaternary ammonium compounds, boron nitride, fiberglass, ionic salts and short lengths of conductive carbon fibers. In many cases the fibers are required to have high tensile and bending strengths. One suitable fiber comprises a plurality of carbon fibers in a polymer matrix and is known as Carbon-ConX™ (Xerox Corp.). Low pressure pultrusion is one process that may be used to bundle thousands of carbon fibers, ensuring redundancy in the contact point within a suitable binder resin. This process often involves pulling the carbon fibers and a thermoplastic or thermosetting polymer through a shaping and curing or solidification die. The contacts are characterized by high density of evenly distributed conduction sites, high immunity to the formation of non-conductive films, and high contact integrity in contact degrading environments. As noted earlier, selection of a fiber will depend in part upon the desired electrical resistance and the requirements of the intended application.

For one type of fiber filler, the precursor fiber is a polyacrylonitrile (PAN) and it is treated by controlled temperature carbonization. The details of this process are provided in commonly assigned U.S. Pat. No. 4,553,191, the contents of which are incorporated herein by reference in their entirety.

The methods described herein can be used in making components have plated layers of any size, including small plated layers having a surface area of about 0.001 to about 100 mm$^2$. Large-scale production of small components having very precisely controlled mechanical and electrical properties can be achieved.

One useful type of electrical component contains a high loading of carbon fibers held together by a thermoset or thermoplastic polymer binder. The trace amounts of metal plating catalyst in and/or near the surface of the electrical component provide for strong adhesion of the metal plated layer on the component surface. One particular configuration of an electrical component comprises an epoxy resin binder, a crosslinking agent, a filler comprising carbon fiber, and a palladium catalyst. In this embodiment, the epoxy resin typically is used in an amount of about 1 to about 90 parts by weight, or about 2 to about 60 parts by weight, or about 2 to about 10 parts by weight based on 100 parts by weight of resin and filler. The carbon fibers are present in an amount of about 10 to about 99 weight percent or about 80 to about 98 weight percent or about 90 to about 98 parts by weight based on 100 parts by weight of resin and filler. One non-limiting example of a crosslinking agent to be used with epoxies in an amount of 0.1 to about 2.0 parts by weight based upon 100 parts by weight of resin is a complex heterocyclicamine, Lindax (Lindau Chemicals, Inc, Columbia, S.C.). Suitable metal plating catalysts include, but are not limited to Pd, Pt, Cu, Ag, Rh, Ir, Au, Ru, Re, Os as well as Co and Ni and blends, alloys and compounds thereof. The metal plating catalyst is present in an amount of about 0.01 to about 5000 ppm. The electrical resistance and mechanical strength of the resulting components can be precisely tuned to meet the requirements of the intended application.

Figure 4:
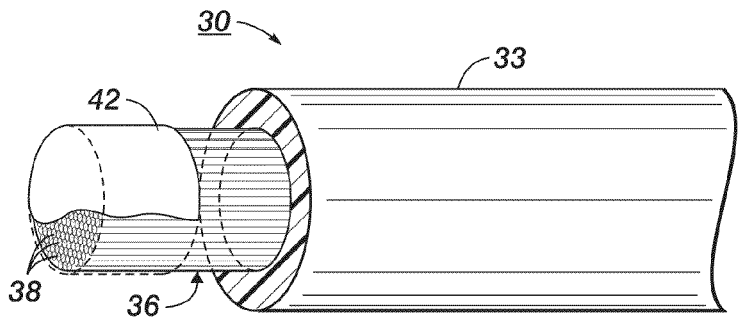
FIG. 4 shows a metal plated probe according to another embodiment, partially cut away.

FIG. 4 shows another embodiment of an electrical component, generally designated as 30. The component has a core 36 formed from binder and fibers, similar to the construction shown in FIG. 2. A sleeve layer 33 surrounds the core 36 over at least a portion of its length. A portion of the sleeve layer has been removed in order to expose the terminal end 38 of the core 36. The sleeve layer resistance may be lower than the resistance of the fibrous core material or may be greater than the fibrous core depending upon the specific material compositions of the two layers. Use of the dual layer component enables precise control of the resistance by cutting away a specific quantity of the layer 33 and controlling the length of the core 36 that extends between the sleeve 33 and metal plated terminal end tip 42. A metal plated layer 42 (shown in FIG. 4 as partially cut away to reveal the ends of the core 36) is adhered to the terminal end 38 of the core 36 and an adjacent portion of the outer surface of the core 36.

The electrical components shown in FIGS. 1 and 4 can be designed to have a wide range of tightly controlled electrical and mechanical properties. The type and quantity of the filler (s) can be selected to result in the desired properties because good adhesion of the metal layer 42 can be obtained for a wide range of fillers, filler quantities, blends of fillers, and polymer types.

The polymeric portion of the composite can be a thermoset or thermoplastic polymer. Suitable thermoset and/or thermoplastic polymers for use in making the component include, but are not limited, to epoxies, acetals, ionic and non-ionic polyurethanes, polyimides, polyesters, silicones, synthetic and natural rubbers (ionic and non-ionic), polyether sulfones, polyether ether ketones, polyether imides, polystyrenes, polyolefins, polyethylene terephthalates (PETs), polyamides, polyvinyl chlorides, polyphenylene oxides, polycarbonates, ABS, silicones, and blends and copolymers containing the above-listed polymers. As indicated above, the polymer or pre-polymer thereof must be dispersible in a liquid and solidify upon drying, cooling, and/or cross-linking. The polymer is present in an amount of about 0.1 to about 99 parts by weight, or about 1 to about 25 parts by weight, or about 2 to about 20 parts by weight based upon 100 parts by weight of the polymer and filler.

When the polymer is a thermoset, it is crosslinked using a suitable crosslinking agent, such as a substance that induces crosslinking, the application of heat, pressure, or radiation, or a combination of these. A crosslinking agent can be used in an amount of, for example, about 0.1 to about 10, or about 0.5 to about 2 parts per hundred (pph) by weight based upon the weight of the polymer.

The liquid in which the solvent and filler are dispersed typically is a diluent and in some cases may be a solvent. Generally stated, a "diluent" is a diluting agent that allows a liquid polymer to become thinner, less concentrated, and/or less viscous. A "functional diluent" as used herein is a diluent which has at least one chemically reactive (or functional) moiety that has been added to the molecular chain whereby crosslinking can occur between the diluent molecule(s) and the molecules of a polymer. A solvent is a fluid in which a solid can be at least partially dissolved.

The filler can be fibers or filaments, including carbon fibers, carbon filaments, carbon nanotubes, carbon nanofibers, carbon nanofilaments, or fiberglass, as well as polymeric types, either synthetic or natural fibers or filaments such as nylon, polyester, silk, and the like. Blends of fillers may be used. In some embodiments, the filler is present in the composite in an amount of at least 1.0, and usually is present in about 5 to about 99.9 parts by weight, or about 75 to about 99 parts by weight, or about 80 to about 98 parts by weight based upon 100 parts by weight of the polymer and filler. The methods described herein are particularly useful for making filled polymeric components for which metal plating will not adhere if conventional plating techniques are used. Different fillers and even different polymers can be combined and used together in a single substrate.

While not intending to be bound by theory, it is believed that the metal plating catalyst is slightly soluble or at least dispersible in fine powered form in at least one of the ingredient polymers or a solvent system used in the process. As mentioned earlier, only very small quantities of the metal plating catalyst are required and can be adjusted to meet the requirements of the final application and/or the metal plating process(es). Quantities may be in the range of 0.01 ppm to greater than 5000 ppm but typically are in the range of 1 to 5,000 ppm, or 2 to 3000 ppm or 3 to 500 ppm. Since the concentrations of catalyst are very low when compared with the other ingredients used in the composite (i.e. the filler, polymer and crosslinking agent), it is generally a useful practice to quantify those concentrations in units of parts per million (ppm) based upon the total weight of the final composite excepting any metal overplating. This is the convention used throughout this document. Larger quantities of catalyst can be used but are generally not necessary to achieve good adhesion of the metal plate layer formed thereon and may compromise or even enhance other properties of the resulting composition.

Metals that can be plated in accordance with the embodiments described herein include, but are not limited to Au, Ag, Sn, Cr, Cu, Ni, Zn, Be, Pt, Pd, Ti, Mo, and Mn as well as blends, alloys and compounds thereof. Multiple metals can be plated on the same component. The first layer plated on the substrate can be a continuous layer or a discontinuous layer. The metal plate layer or layers can be deposited onto the surface of the composite member in any thickness that fulfills the requirements of the intended application and can range from a monolayer for example in the range of about one or more angstroms in thickness up to and including about many tens or even hundreds of microns. Thicknesses up to 1 mm and larger can be produced. The metal may be in a single layer or in multiple layers as required and the thickness of each layer may be the same or may be different again depending upon the application. Different metals including metal alloys can comprise the various layers as required.

In general, the metal layer or layers should have sufficient adhesion strength to secure them on the surface of the composite and once thereon to sufficiently resist forces (viz. compressive, tensile, shear, impact, and/or thermal forces) that would tend to cause the metal layer or layers to delaminate, abrade from, fall off of, or otherwise be removed or displaced from the surface during normal use, shipping, and/or storage of said member. Specific measures of the adhesion are provided below. Broadly speaking, the adhesion strength produced at the interface between the first metal layer that directly contacts the composite's surface should minimally be a measurable fraction, for example but not limited to 5% or greater, of the cohesive strength of either the composite or the metal(s) that comprise the coating layer(s). In some cases, the adhesion strength of the metal-to-composite interface will be higher than the cohesive strength of the substrate or metal over-layers. In certain instances, the adhesion strength will be 50% to 500% higher than the cohesive strength of the substrate or metal layers. In this case, any force sufficient to cause failure of the plated component would originate said failure within the composite layers or within the metal over-layers before failure or fracture would happen at the metal coating-to-composite interface. In some embodiments, the metal layer cannot be delaminated from the component at a load of less than 50 mN, or less than 75 mN, or less than 100 mN.

Figure 5:
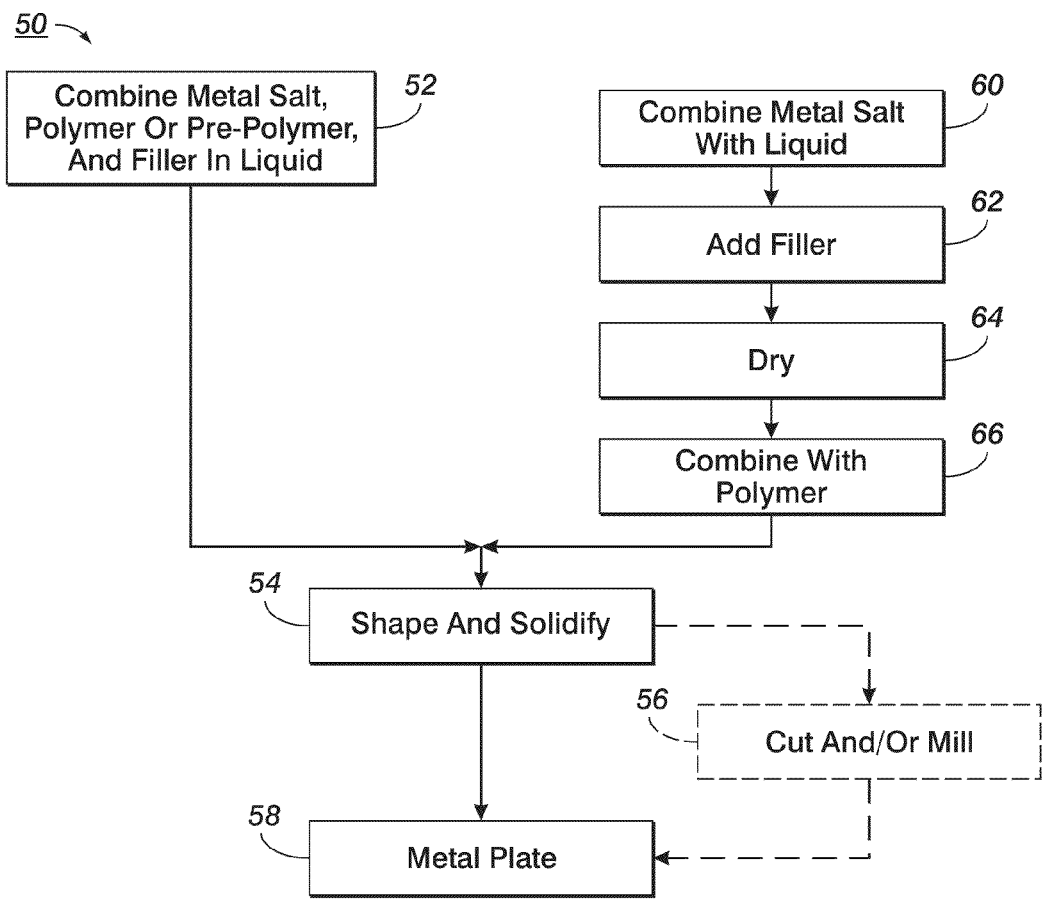
FIG. 5 is a flow chart showing a method of forming a plateable composite according to one embodiment.

FIG. 5 shows a method for producing a composite component in accordance with one embodiment. The overall method is designated as 50. A metal salt, a polymer or a pre-polymer in liquid form and a filler are combined in a liquid at 52. In some cases, the liquid polymer itself can serve as a solvent. The materials are blended to form a homogeneous mixture, which is then shaped into a desired configuration and solidified at 54. If the polymer is a thermoset or a crosslinkable thermoplastic or a hybridized thermoset-thermoplastic which may be amorphous, a suitable crosslinking agent is added or otherwise employed. After the component is solidified, it can be cut or milled, if necessary at 56, and then plated with a metal plate layer at 58.

As an alternative to combining the metal salt with the polymer and filler substantially simultaneously, the metal salt can be combined with a liquid (usually a solvent) at 60, followed by addition of the filler at 62. The filler can then be dried at 64 in order to incorporate the metal plating catalyst into, with and/or onto the filler. The dried filler combined with the catalyst can then be combined with the polymer at 66. Subsequently, the component is shaped and solidified at 54, optionally cut and/or milled at 56, and eventually metal plated at 58.

Figure 6:
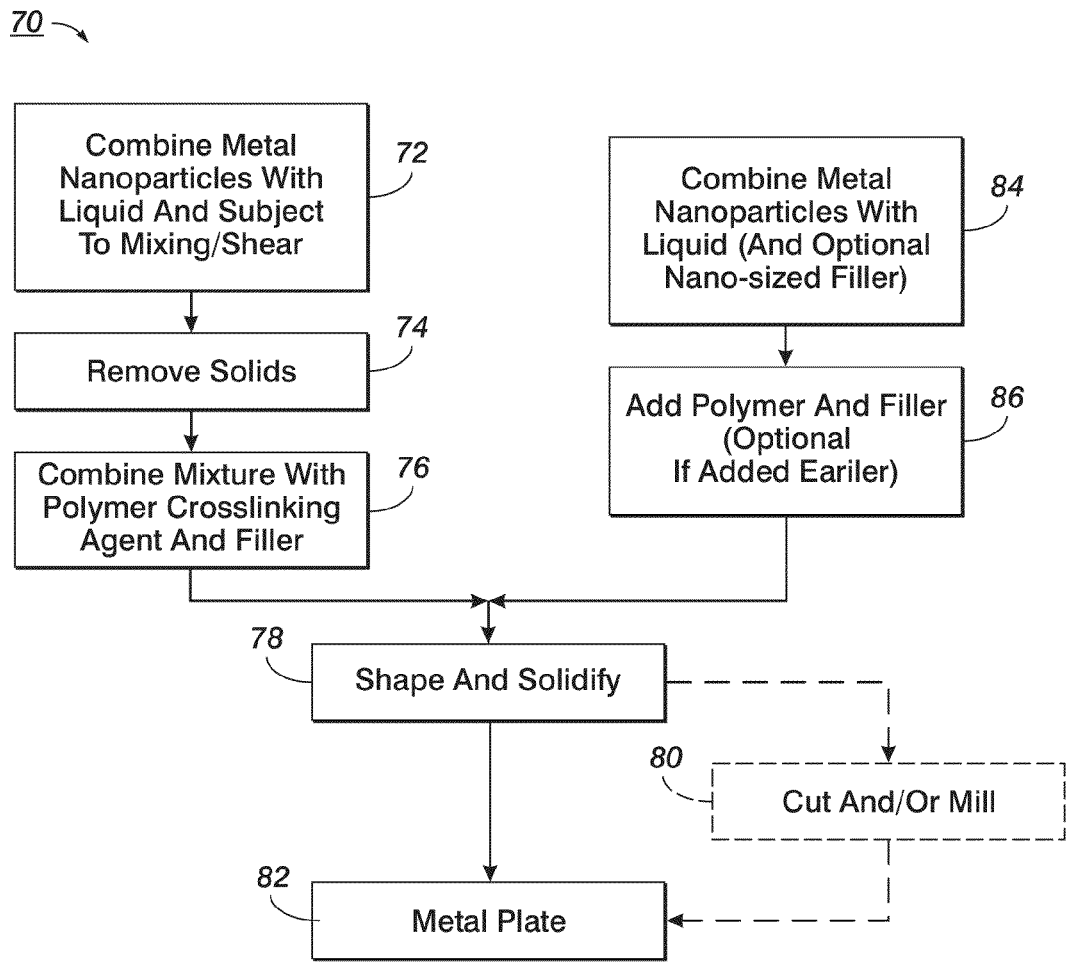
FIG. 6 is a flow chart showing a method of forming a plateable composite according to another embodiment.

FIG. 6 shows an embodiment of a process in which the metal plating catalyst is in the form of fine nanoparticles, or in other words, fine particles whose size is expressed conveniently in nanometers, such as but not limited to essentially round palladium metal in the range of about 1 to 100 nm, or from about 2 to 80 nm or form about 5 to 50 nm, or shards of palladium in this same size range. The process is generally designated at 70. The catalyst is combined with a liquid (usually a diluent, which may be a functional diluent) at 72 and the mixture is subjected to conditions of mixing and shear and/or heat that result in the formation of metal nanoparticles suspended or dispersed in the diluent. The remaining excess of particulate solids is removed at 74 where size-specific filtration for example may be used to separate excess particles that are typically relatively large and may be agglomerates of the finer metal catalyst particles. The liquid diluent containing metal nanoparticles is combined with polymer, crosslinking agent, and filler at 76. The mixture is shaped and solidified at 78 to form a component. Optional cutting and/or milling takes place at 80 and plating of a metal layer on the component occurs at 82.

As an alternative, metal nanoparticles are combined with liquid (usually a diluent) at 84, with the optional inclusion of nano-sized filler particles. The mixture is pre-blended which may include high shear and/or ultrasonic mixing and then combined with polymer at 86, as well as with suitable crosslinking agent as required and any larger fillers. The mixture is shaped and solidified at 78 to form a component. Optional cutting and/or milling takes place at 80 and plating of a metal layer on the component occurs at 82. The sequences of processes 50 and 70 may be performed in a time continuous manner or with time interruptions occurring between one or more of the individual steps depending upon the requirements of the end application or business model of the firm employing the subject processes.

In certain embodiments, a mixture of two or more solvents, such as acetone and toluene, is employed to enable direct solubilization/dispersion of the salt of a metal plating catalyst into a polymer system. In certain embodiments one of the solvents may be water. The type and amount of solvent(s) allows for precise control of the critical process viscosity of the resin blend during, for example the most critical resin-fiber impregnation stage of the pultrusion process or during the stage where polymer, filler, catalyst, and crosslinking agent are blended. Test results indicate that after solvent drying and after curing of the resin system is complete, the metal moiety appears in sufficient mass to enable direct electroless metal plating onto the exposed surfaces of these composites. A suitable contact mask is used to control the precise location where selective metal deposition occurs on the part. Test results show good metal-to-polymer adhesion.

One method of forming a composite involves mixing a polymer with a metal plating catalyst (in the form of a salt) with filler in a liquid that disperses and may at least partially dissolve the metal plating catalyst. The polymer solution containing the catalyst and crosslinking agent is used to completely wet the fiber filler which once combined, and optionally any excess polymer is removed, are subsequently formed to the desired shape and are crosslinked into a solid composite. To form the plated component, the crosslinked composite is optionally cut and/or milled, partially covered with a suitable contact mask, and is then subjected to electroless and/or electrolytic plating.

Another method involves incorporating the metal plating catalyst into and/or onto the filler material before it is mixed with the polymer. The metal plating catalyst is dispersed and/or dissolved in a liquid, the filler is added, and the wetted filler is then dried. In some cases partial drying of the filler is acceptable and in other cases complete drying may be required. The filler is then combined with a liquid polymer and crosslinking agent and, after crosslinking, is optionally cut and/or milled and subsequently is metal plated.

Yet another method involves mixing a metal plating catalyst in the form of nanosized particles with a liquid functional diluent. The mixture is agitated, shear mixed and heated in order to suspend or disperse the nanoparticles of the metal plating catalyst in the diluent. The liquid diluent is separated from the remaining, typically larger, solid particles and the liquid dispersion is combined with a polymer, crosslinking agent and at least one other filler. The mixture is further agitated, formed into the desired shape and cured. This process results in bonding of metal plating catalyst nanoparticles to the polymer and/or the filler. The shaped component is optionally cut and/or milled, and is then metal plated with electroless or electrolytic metal plating.

A further method involves mixing metal nanoparticles with a diluent and optionally with nano-sized filler particles, such as but not limited to carbon nanotubes, boron nitride nanotubes, carbon nanofilaments, nanosize silicates, nanosize stearates, and the like. The mixture is agitated, shear mixed and heated. The liquid polymer is then added, along with filler if not already completely added. The mixture is then agitated, shear mixed and optionally heated, and then formed into the desired shape and crosslinked. The resulting component is optionally cut and/or milled, and is then metal plated using an electroless and/or electrolytic metal plating process.

The liquid can be a system of two or more liquid solvents and/or diluents. In certain embodiments, a liquid system is selected that will effectively disperse and/or dissolve both the metal plating catalyst and the polymer. When an epoxy polymer is used, a nonpolar solvent system such as toluene, xylene, benzene, diethyl ether, hexane, heptane, and the like can be employed. When the metal plating catalyst is an organic salt of Pd or Cu, solvents such as acetone, methyl ethyl ketone, ethyl alcohol, methyl alcohol, isopropyl alcohol, butyl alcohol, methyl isobutyl ketone, DMSO, or DMF can be used to disperse and/or dissolve the salt. In one embodiment a mixture of toluene and acetone solvents is used. It is noted that a liquid polymer system itself can serve as the solvent if the metal plating catalyst will at least partially dissolve in it.

When the metal plating catalyst is anchored to the surface of the fibers, aqueous water emulsions, dispersions or solutions can be spin coated, spray coated, dip coated, or otherwise coated onto the surface to get the metal onto the surface. Emulsions containing Pd/salt nanoparticles can be applied to the fiber surface as part of a fiber sizing process where in general a solution containing at least a prepolymer such as epoxy monomer or a polymer such as polyvinylpyrolodone (PVP) is applied to and allowed to dry upon the surface of fibers such as carbon and fiberglass in order to facilitate handing during processing of the fibers and to enhance bonding of the impregnating polymer to the fibers.

In order to metal plate the composite with a conductive metal, a conventional electroless plating process can be used. Briefly stated, a bath containing the metal to be plated is prepared and at least the portions of the substrate to be plated are immersed in the bath. For example, for copper plating, a bath of copper sulfate can be used. Electrolytic plating processes also can be used to plate the substrates described herein. However, in the case of the electrolytic plating process option, the concentration of palladium or other metal catalyst that appears on the surface of the component may need to be higher than in the case of electroless plating in order to achieve acceptable plating performance. One or more layers can he plated on the substrate. The plated layers must have sufficient adhesion to avoid autodelamination or any unwanted delamination and should be sufficiently adhered to withstand shrinking and swelling of the substrate and the substrate-inner metal layer interface without delamination or peeling.

The substrates described herein can be plated at an efficient plating rate typical of a commercial plating process. No pre-etch step is required, reducing the overall manufacturing time and simplifying the manufacturing process, thereby increasing the overall processing rate.

The following Examples are intended to illustrate and not limit the scope herein.

COMPARATIVE EXAMPLE 1

Component Containing No Metal Plating Catalyst

In this experiment, the components used were 1.3 cm long, 254 micron to 330 micron diameter pultruded composite rods that comprised high loadings of r-fiber (>90% by wgt) held in a low viscosity, liquid resin, Epon 862 (Hexion Specialty Chemicals, Houston, Tex.), manufactured from epichlorohydrin and Bisphenol-F. Crosslinking of the epoxy resin was initiated with a 1-(2 hydroxypropyl imidazole) crosslinking agent, Lindax1 (Lindau Chemicals, Inc, Columbia, S.C.). The ends and or sides of some of samples were cut and/or milled using an eximer laser (Resonetics, Inc., Nashua, N.H.). The pultruded rod samples were made using a pre-production scale process. No metal plating catalyst was used in these particular samples. The tip surface region of the composite rod sample, which had a diameter of about 285 microns was gold plated using a conventional electroless plating process.

Figure 7:
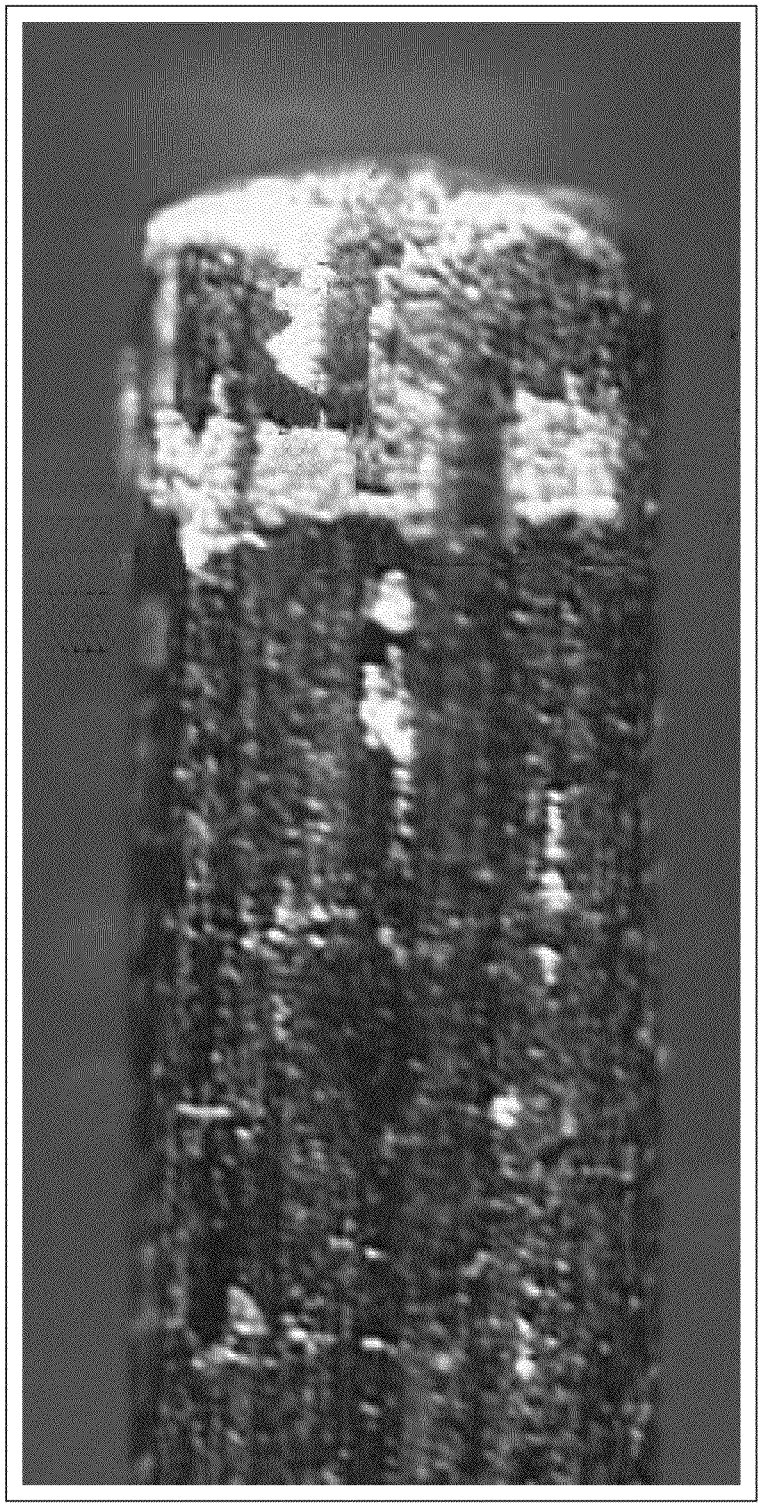
FIG. 7 is a photomicrograph showing the surface of a composite rod upon which metal adhesion is poor.

A selected set of physical, mechanical and electrical properties was measured and results from early electrical performance and handling tests revealed that the gold tip initially performed reasonably well and appeared to meet expectations. However, as the test continued, the electrical results became noisy and then a significant fall-off in performance was noted. A correlation was made between the fall-off in performance and flaking off of gold coating from the sample. In other similar tests that were conducted to further substantiate the cause of the performance fall-off, mechanical testing revealed that the adhesion of the gold to this specimen was poor as can be shown by the significant loss of gold coating from the side regions where it was easy to remove the gold coating from this sample. The used component is shown in FIG. 7. The formula representing the basic composition used in this example is shown below where in the base case, the concentration of metal plating catalyst is zero:

X % [resistive-carbon fiber]+Y % [epoxy resin]+Z % [crosslinking agent]+0% metal plating catalyst - - - $_\Delta$ - - - →[composite polymer]–in form of solid component

EXAMPLE 1A

Preparation of Composite Containing Substantial Quantity of Filler and Containing Metal Plating Catalyst A set of experiments (examples 1A though 7 below) was conducted to identify the materials and process variables believed to be key and to establish their effects of upon the properties of the pultruded rods prior to metal plating, as well as properties of a resulting metal plated component. The procedure described below was conducted to prepare the composite rod shown in FIG. 8. Individual 6-8µ fibers are shown aligned in an axial array spanning the entire length of the external surfaces of the rod (see also FIG. 2). The rod was made by a conventional commercial pultrusion process using the polymer, crosslinking agent and fiber filler as generally described in Comparative Example 1. However a small amount of palladium salt as a metal plating catalysts was added by a simple mixing/blending methodology. The high fiber loading as well as the high surface population density of aligned fibers are features of these high fiber content pultruded rods which appear to be independent of the manufacturing source of the subject composite.

Figure 8:
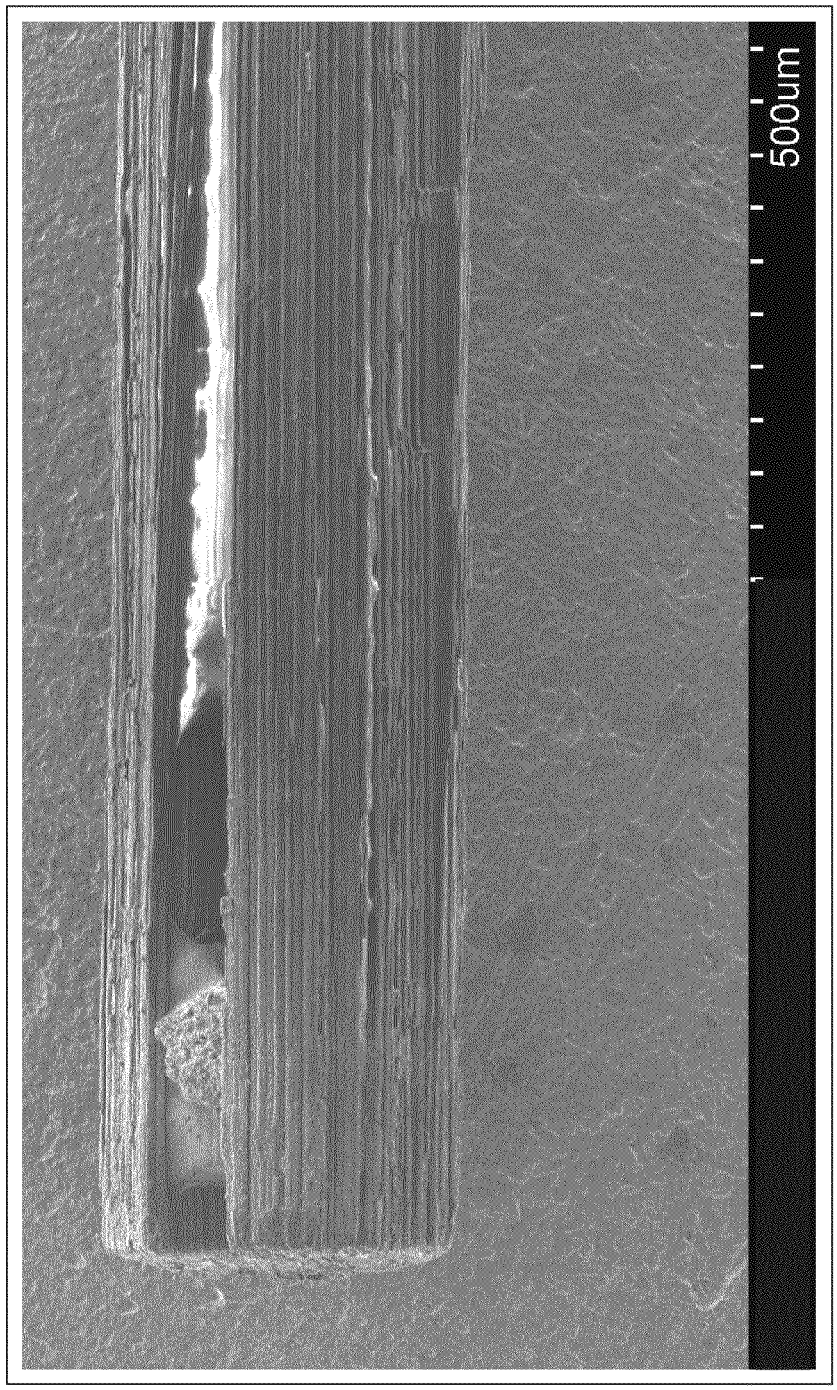
FIG. 8 is a photomicrograph showing surface defects on an unplated composite rod containing high quantities of fiber filler.

In the rod shown in FIG. 8 there is a surface defect that appears as a crevice approximately 20-50µ wide running along the rod's outermost region. By comparing the features of the outermost surface away from the crevice with what can be seen inside the crevice away from the polymer rich regions, it is evident from FIG. 8 that a high loading of r-fibers populates not only the volume of the sample but the surface as well. FIG. 8 also shows that within the crevice there is a relatively small, but highly concentrated amount of metal plating catalyst that was not well dispersed throughout the composite which resides as a large mass between the fibers. This shows the types of defects or irregularities that the plating process may encounter and must endure if the overall process is to be considered robust and of high quality.

Figure 9:
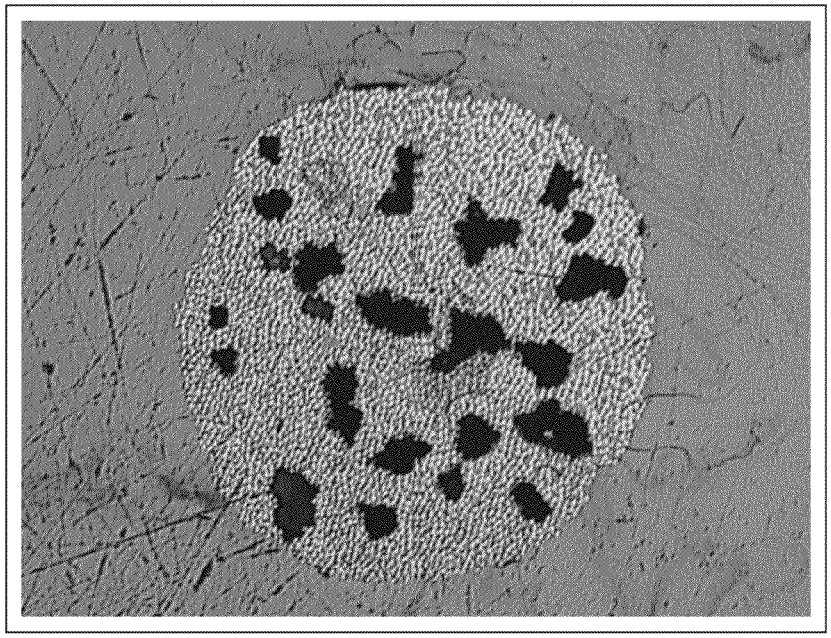
FIG. 9 is a photomicrograph showing an uneven surface at the end of a composite electrical component according to one embodiment.
Figure 10:
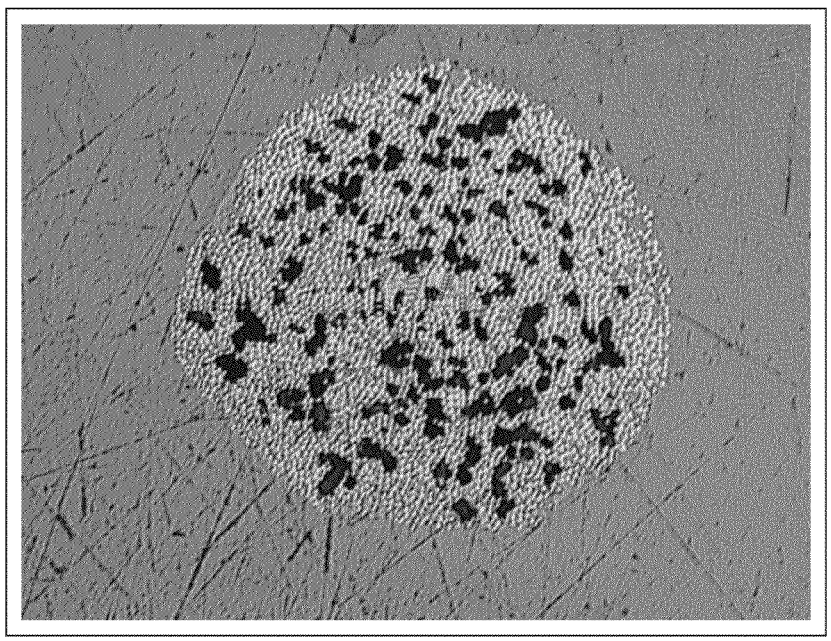
FIG. 10 is a photomicrograph showing an uneven surface at the end of a composite electrical component according to another embodiment.

In addition, FIGS. 9 and 10 are SEM photos of two cross sectional end views of pultruded rods made from the same composite as is described in Example 1B below. These figures show the distribution of fiber filler and polymer within the cross sectional area of the rod samples. They also reveal the presence of internal voids within the rods. Naturally, it is desirable that non-uniformities such as those indicated whether they occur either on the surface or within the bulk of the composite, do not adversely affect either the metal plating process or the quality of the metal plating that is deposited onto the subject composite. Because the plating catalyst occurs within the bulk of the composite and is used to provide a sufficient amount of catalyst at every point within the bulk and upon the surfaces, whether they result from internal voids or manufactured surfaces, reliable and high quality metal plating can occur at every location required by the final application.

FIG. 7-8 provide insights showing that these highly filled composite polymers are significantly different from either the pristine polymers or the lightly filled composite polymers that generally employ micron sized fillers that are typically encountered by contemporary metal plating processes. It is generally known to those skilled in the art that conventional plating techniques cannot he used to form plating layers that remain adhered to the surfaces of the subject heavily filled composites. The change to the foundational composition formula that is achieved by embodiments described herein can be illustrated as follows:

x % [r-fiber]+y % [epoxy resin]+z % [crosslinking agent]+A % [metal salt] - - - $_\Delta$ - - - →[metal atom or metal salt containing composite]

EXAMPLE 1B

Forming Unfilled Resin Containing Small Amounts of Metal Plating Catalyst, and Plating Trace amounts of palladium chloride salt as a finely ground power were directly combined with liquid epoxy resin (EPON resin 862, Hexion Specialty Chemicals, Houston, Tex.). According to the literature, EPON Resin 862 has an epoxide equivalent weight of 165-173 g/eq, a viscosity at 25 Deg. C. of 25-45 poise, and a density at 25 Deg. C. of 9.8 lbs/gal. The objective was to examine details about the degree of solubility or dispersability of the salt in the resin along with what concentration and form (i.e. soluble atoms or dispersed powder) are needed to show any favorable impact upon the electroless metal process. The procedure involved adding 5.0 mg of $PdCl_2$ salt, in powered form directly to 10 g of the epoxy resin. Rigorous hand mixing and intermittent grinding (c. 30 minutes at c. 20-30 RPM with a wooden stirring blade) was used to mix the power into the viscous resin. A rest period of about 1 hour was used to allow any large particles of the brownish colored and opaque salt particles to sediment-settle to the bottom of the translucent container that contained the mixture. A slight change in color (from clear to yellowish) was observed that indicated the presence of what was believed to be some slight solubility of the metal salt in the resin and/or dispersion of ultra fine particles within the resin. The uppermost yellow (i.e. light straw) colored resin liquid was separated from the lower liquid+portion containing the large particles by decanting the upper from lower liquid portions. The clear, yellowish color remained in the upper liquid phase after a further rest period of at least 12 hrs after separation where no further sedimentation of particles could be seen either with the naked eye or with 20-30× magnification.

At this point, 0.5 g of cross-linking agent (Lindax 1) was mixed with the resin and hand blended to a uniform appearance, after which various castings (2-3 g each) were made from the catalyzed resin into round, aluminum weighing dishes, followed by curing of each of the castings in a circulating air oven at 60 C for 2 hrs and at 80 C for 1 hr, then post curing at 120 C for 1 hr. The resulting samples changed color to a deep brown color and showed no visible indication of any sedimentation formation at any of the surfaces during the curing process. One sample was subjected to ICP analysis to determine Pd content. It was determined that sufficient Pd was present in the sample for it to be detectable using a low resolution instrument. Further analyses confirmed that Pd that was present in this sample.

A set of identical samples from the various castings referred to herein as "epoxy pucks" were plated with electroless copper using a standard commercial electrolysis plating process. Results indicated that the process responded favorably to the presence of trace amounts of Pd in the cured resin. Using a subjective scratch-tape test, it was found that adhesion to the unfilled resin was good. While not being bound to any particular theory, it is believed that the trace amounts of Pd present in the sample were probably in the form of a resin-soluble species and that absorbed and/or adsorbed water on the polymer may have had a favorable impact on adhesion.

EXAMPLE 2

Identification of Solvent for Dissolving Salt of Metal Plating Catalyst in Resin; Introduction of Filler A set of experiments was conducted to determine whether a solvent or mixed solvent system could be identified and used as a vehicle to introduce dissociated Pd (from $PdCl_2$) into a polymer resin. It was discovered by experiment that epoxy resin EPON 862 is highly soluble in toluene (viz. an aromatic solvent). A series of sample coupons (viz. pucks) were prepared (Sample Coupons A, B, C and D) using 10 g of catalyzed EPON 862 for each of the samples and various amounts of toluene into which trace amounts of powdered $PdCl_2$ salt were mixed. It was found that in the presence of toluene, the solubility of $PdCl_2$ was unchanged from the pristine resin. Thus, while toluene was a good solvent for the liquid resin, it was found not to be a suitable solvent for the inorganic salt. It was discovered (and confirmed by experiment) that $PdCl_2$ exhibits a slight solubility in acetone, but that the resin was not significantly soluble in acetone (and probably not in aliphatic solvents in general).

Experiments were conducted using various ratios of acetone and toluene, resulting in the discovery that a 50/50 wt % mixture is an acceptable vehicle for dissolving both the inorganic salt and the organic resin in a common solvent system. A set of component samples (Sample Component E, F), were made using an in-house lab-scale pultrusion process that was used to combine 25 g of EPON 862 resin and 0.14 g of cross-linking agent (Lindax 1) with 10 g of a 50/50 mixture of toluene and acetone into which 0.05 gms of $PdCl_2$ was dissolved. A length of about 2 meters of resistive carbon fiber (Hexcel/MTLS produced) was segment-wise immersed into the resin solvent system mixture, resulting in impregnation of the fiber with the liquid solution containing polymer, crosslinking agent and catalyst, then tensioned and pulled into and through a prototype forming die consisting of the tapered section from a conventional, laboratory-grade, glass pipette. The die served to condense and compress the wetted fiber mass into a reasonably-controlled diameter cross section. Once the entire length of fiber passed through the die, it was cut into shorter lengths (of approximately 0.3 to 0.5 meters). The fibers were hung vertically in a circulating air oven to cure and post-cure the composition. Clip-on type weights were clamped onto the free lower ends of each specimen to keep the samples straight and place them under slight tension during the planned thermal cycles. Curing of the (resin+fiber+$PdCl_2$+solvents) was done by ramping the oven temperature from room temp(RT) to 100 C over a 1 hour period, curing the samples for 1 hr at 100-102 C, and then post curing at 130 C for 1 hr. The oven was then turned off and the samples were allowed to cool to room temperature over a period of about 1 hr. The fiber content in the resulting rod samples was estimated to fall in the range of 86-92 wt % based upon the total weight of polymer and fiber.

Pd concentrations were measured for some of the samples, which showed Pd concentrations ranging from undetectable, i.e. <100 ppm, up to 1420 ppm (see Table 1 in Example 3). Shorter samples were cut from the samples produced and were then eximer laser end-cut and milled, and then divided into groups that were electroless and electrolytic metal plated. The samples were plated with copper using the same electroless plating process as was used in the Comparative Example above. Results from tests conducted on the electroless plated samples confirm that plateability and metal-to-polymer adhesion were acceptable. Device performance tests, specifically some high frequency electrical tests, were conducted and the results confirmed acceptable DC and high frequency signal response. Thus, it has been demonstrated that trace amounts of Pd, such as about 100 to about 1500 ppm, when introduced to and through the resin phase of the multi-constituent containing composite, are sufficient to favorably impact the plating process including the metal-to-polymer adhesion strength. This embodiment is therefore established as a materials composition and process that can achieve the specification requirements of the composite.

EXAMPLE 3

Adding Metal Plating Catalyst to Filler Material and Plating

A set of experiments was conducted to establish the extent to which trace quantities of suitable metal salts could be employed to improve the adhesion of metal plating on the surfaces of the composites. Since there is typically more fiber filler in these types of composites than polymer, an experiment was designed to examine if the relatively high surface area of the r-fiber could be used to deliver higher quantities of the Pd catalysis to the resulting surface of the pultruded composition. A set of solid rod samples was prepared using a pultrusion process in which water was used in one case to dissolve a quantity of about 50 mg of $PdCl_2$, and in another case acetone was used to dissolve about 50 mg of the same salt. In both cases the salt solutions were applied directly to r-fiber (by dipping, lot 043, c. 3 meter lengths into the solutions) followed by air drying for 8 hours at room temperature, followed by drying in a circulating air oven @40 C for 1 hr. The samples were identified as Sample Component G (water), and Sample Component H (acetone). Short sample lengths of these rods were subjected to eximer cutting/milling followed by metal plating using a conventional electroless metal plating process. Results from the plating of the samples indicated that excellent plating and adhesion results were obtained. The results from ICP measurements indicate that Pd is present at detectable levels in at least the Sample Component H sample in the range of about 250-300 ppm which is considerably higher than when the catalyst is introduced through the polymer alone (See table below sample Component E).

The plating and electrical test results of the above Examples indicate that not only the resin, but also the fiber constituent, or both, can be used to get the required amount of metal into the composite.

Table 1 below provides the analytical results from Pd concentration measurements of certain samples from Examples 1B, 2-3. ICP testing was conducted by first weighing each sample into a platinum crucible with flux. The crucibles were placed in a furnace and heated to 600° C., held for 6 hours, heated to 950° C., held for 1 hour, and cooled to room temperature. 15 ml of 50% HCl was added and the crucibles were covered and heated gently on a hotplate for approximately 60 min. The solutions were cooled and then transferred to 50 ml volumetrics. One ml of a 2% Triton X solution was added, and the solutions were brought to volume with deionized water. One blank and two standards were prepared. All solutions were analyzed using the TJA Iris ICP. Analysis of $PdCl_2$ by ICP was found to be 45% Pd.

TABLE 1

ICP Results

| Sample No. | Pd | $PdCl_2$* | $PdCl_2$** | Approximate Pd Detection Limit (sample weight dependant) |
|---|---|---|---|---|
| Sample coupon A | 1420 ug/g | 2370 ug/g | 3160 ug/g | 10 ug/g |
| Sample coupon B | 302 ug/g | 503 ug/g | 671 ug/g | 10 ug/g |
| Sample coupon B Duplicate | 110 ug/g | 183 ug/g | 244 ug/g | 10 ug/g |
| Sample Component E | ND | ND | ND | 100 ug/g |
| Sample Component G | ND | ND | ND | 100 ug/g |
| Sample Component H | 271 ug/g | 452 ug/g | 602 ug/g | 100 ug/g |

*theoretical based on 60% Pd in $PdCl_2$
**based on 45% Pd in A.E. $PdCl_2$ analysis

EXAMPLE 4

Formation of Metal Plating Catalyst Nanoparticles; Incorporation into Component

A set of experiments was conducted to examine the effect upon the plating process that the form of the salt (e.g., soluble metal atoms vs. nanosize solid particles) may have. During a pultrusion process trial, a quantity of 0.25 gms of $PdCl_2$ in the form of ground particles was added to a functional diluent, 40 gms of a diglycidyl ether of 1,4-butanediol diluent (Heloxy 67, Hexion Specialty Chemicals) that in turn was pre blended by a high shear mixer for 1 min followed by heated ultrasonic bath for about 10 min., and then allowed to sit for 10 min. According to the literature, Heloxy modifier 67 has an epoxide equivalent weight of 123.4-136.6 g/eq, a viscosity at 25 Deg. C. of 10-20 mPa-s, a density of 9.10-9.30 lbs/gal and a flash point (Setaflash) of greater than 200 Deg. F. The liquid portion was then siphoned off leaving any particulates behind. Following this, the liquid blend was mixed with 40 gms of epoxy resin (Epon 862) blended by high shear mixer for 3 min then blended into 194 gm epoxy resin system with a high shear mixer for 3 min then put into hot ultrasonic bath and allowed to sit for 5 min to allow air bubbles to escape then loaded into the impregnation bath located at the front end of the commercial-scale pultrusion process. A sample length of pultruded rod composite of approximately 200 ft. was successfully fabricated. The presence of the small particle metal salts appeared to have no adverse affect upon the pultrusion process or the quality of the rod being produced. The concentration of palladium catalyst was measured and results are reported in Table 2 of Example 6B.

EXAMPLE 5

Effect of Resin Viscosity on Degree of Fiber Mass Wetting

During the course of other experiments where pultrusion was used to fabricate the composites in rod form, a particular type of defect was found in certain rod specimens. The defect was observed as cross sectional voids in the pultruded rods (see FIGS. 9 and 10). Taking on the appearance of "Swiss cheese," the voids were randomly sized and distributed, and appeared to be encapsulated air pockets or cells that were devoid of any fiber or resin. The voids were believed to be the result of poor wetting of the resin into the fiber mass, coupled with poor consolidation of the fiber mass within the domain of the pultrusion die. Owing to the difficulty in achieving effective wetting of the entire fiber mass during the resin impregnation stage of a commercial pultrusion process, experiments were conducted to determine the effect that resin viscosity and fiber consolidation may have upon the degree of fiber mass wetting and to attempt to make improvements in the level of void defects. In order to increase the degree of consolidation of the fiber filler, the level of axial twist imparted to the resistive carbon fiber tows comprising the fillers was increased from 0.6 turns per inch (TPI in FIG. 9) to 0.8 TPI (FIG. 10). A decrease in the size of the voids appears to correspond with the increased level of twist.

One way to change (i.e. decrease) the viscosity (and thereby improve the wetting characteristics) of the resin is to use a higher quantity of the mixed solvent (acetone/toluene) that was described earlier. This solvent system is also used as a vehicle to introduce $PdCl_2$ to the pre-cured composition. While it was found that the mixed solvent decreases the resin viscosity in proportion to the ratio of solvent to resin, (i.e. for greater amounts of solvent, the lower the solution viscosity that can be achieved), it was believed that the use of very high levels of solvent(s) would adversely affect the pultrusion process and its outcome. For example, it was believed that use of the even minimal amounts of these mixed solvents would require additional capital investment for exhaust and explosion proofing of the process, and, would also probably decrease the process cycle time.

It was consequently learned that the class of materials known as "diluents" represents a somewhat different mechanism to managing liquid resin viscosity. Through functional group(s) and suitable crosslinking chemistry and process, the diluent becomes a functional diluent and can be integrated as a part of a very large, molecular mass that results from co-crosslinking the resin, diluent, and crosslinking agent together.

Experiments were conducted to determine if a suitable functional diluent could be identified and employed to improve the quality and reliability of production of the filled resin compositions. Trials were conducted using a Heloxy modifer 67, is a low viscosity (13-18 cps) epoxy functional liquid (believed to be a functionalized aliphatic triglycidyl ether) manufactured by Hexion Corp (Hexion Specialty Chemicals, Columbus, Ohio). A quantity of 0.025 gms of Pd in the form of nanosize particles of approximately 40 nm was added to 6 gms Heloxy 67 diluent. This in turn was pre blended by a high shear mixer for 3 mins., followed by heated ultrasonic bath for about 10 min. The mixture was then blended into 194 gm epoxy resin system with a high shear mixer for 3 minutes and allowed to sit in ultra sonic bath for 5 min. The mixture was then loaded into the resin bath container that was used to pultruded r-fiber (lot 043), EPON 862 resin, Lindax curative, and the HELOXY 67+Pd nano particles into a solid rod having diameter in the range of 0.022 to 0.023 inches. A 200 ft length of rod was produced and when evaluated by optical micrography showed more uniform consolidation and less voids. Sample rods were evaluated for Pd content (see Table 2 Run B) indicating a concentration of 21 ppm Pd. Copper plating was applied to a few samples and showed acceptable adhesion and no delamination when subjected to a simple tape peel test. Electric response obtained on the unplated rods showed consistent DC resistance in the range of about 260 ohms and acceptable RF response.

EXAMPLE 6A

Use of Metal Plating Catalyst Nanoparticles and Nano-Sized Filler

In a further experiment, a small quantity of nano-sized, powered carbon nanotubes (CNT) (i.e. abut 0.5 gms pre blended with 40 gms of a functional diluent, Heloxy 67, was further blended with a pre-blend of Pd nano powder in the same diluent, Heloxy 67, was then mixed into the epoxy system resin bath and used to prepare about 200 ft of small diameter rod using a commercial pultrusion process. The objective was to determine if the CNT filler could be effectively dispersed in the composition and if the CNT could serve to modify the electrical properties of the rod sample. Results confirm that the CNT can be blended into the epoxy-fiber composition and result in an acceptable rod specimen containing, e.g., 4 ppm Pd (see Table 2 run C below).

EXAMPLE 6B

Detection of Metal Plating Catalyst in Additional Composite Samples

Epoxy-based composite samples were prepared using a commercial pultrusion process and the palladium metal plating catalysts described in Example 1B, Example 4 and Example 6, and selected samples were analyzed for Pd levels using 1 CP. The results are shown below:

TABLE 2

ICP Results

| BATCH_ID | Pd | $PdCl_2$* | $PdCl_2$** | Nano-PD*** |
|---|---|---|---|---|
| Run A (Example 1B) $PdCl_2$ | 12.8 ug/g | 21.4 ug/g | 28.5 ug/g | |
| Run B (Example 4) Pd' nanoparticles | 21.4 ug/g | | | 21.4 ug/g |
| Run C (Example 6A) Blend of carbon nanotubes and Pd nanoparticles | 4.0 ug/g | 6.6 ug/g | 8.8 ug/g | |

*theoretical based on 60% Pd in $PdCl_2$
**based on 45% Pd in A.E. $PdCl_2$ analysis
***based on 99.9% Pd in Nano-PD (ALDRICH #05003MH)

EXAMPLE 7

Measurement of Adhesion of Metal Plating

Figure 11:
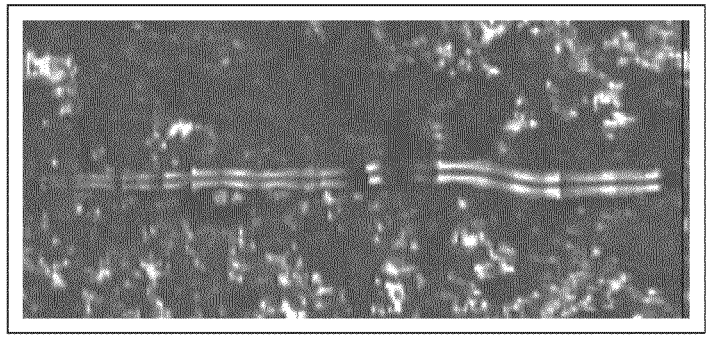
FIG. 11 is a photomicrograph showing a scratch across a copper plated metal substrate subjected to adhesion testing.
Figure 12:
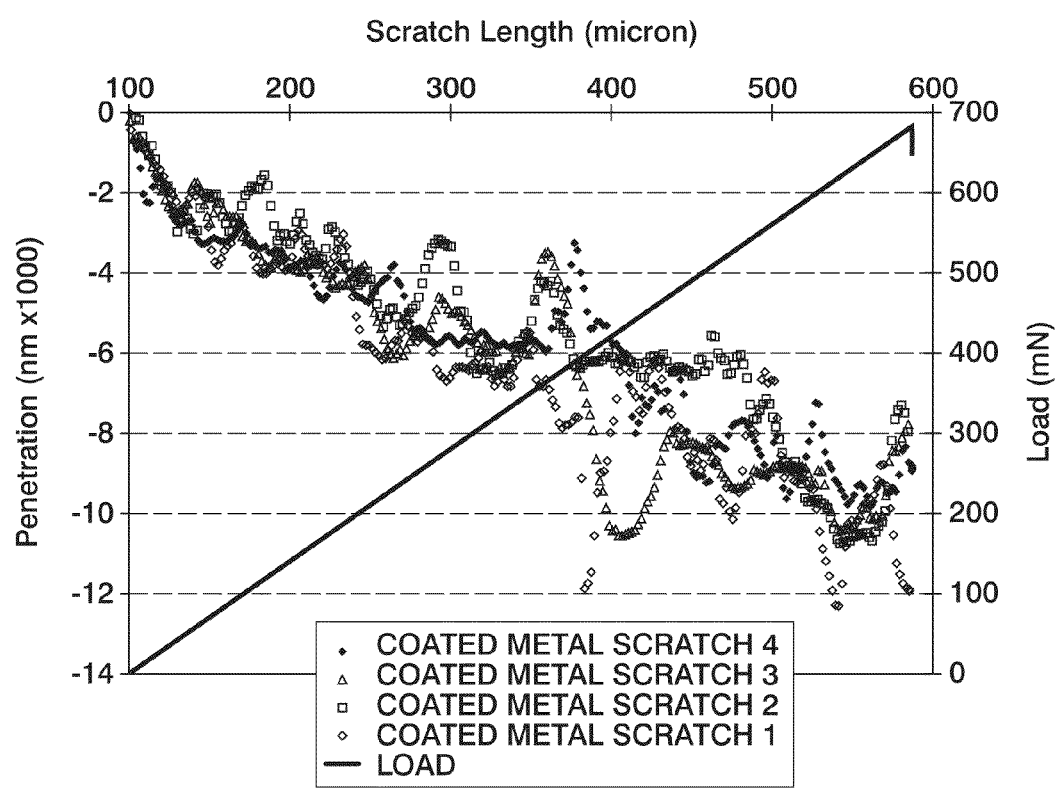
FIG. 12 is a graph showing the relationship between scratch length and both penetration depth and load for the sample shown in FIG. 11.
Figure 13:
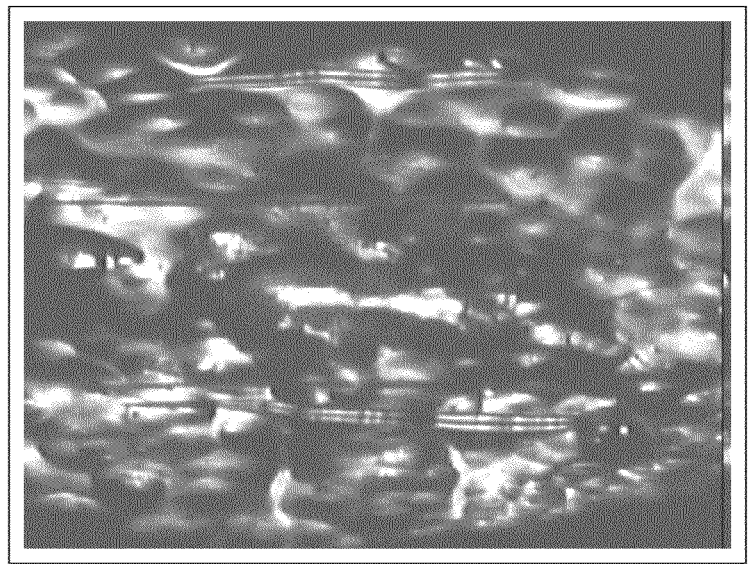
FIG. 13 is a photomicrograph showing a scratch across the surface of a copper plated carbon fiber subjected to adhesion testing.
Figure 14:
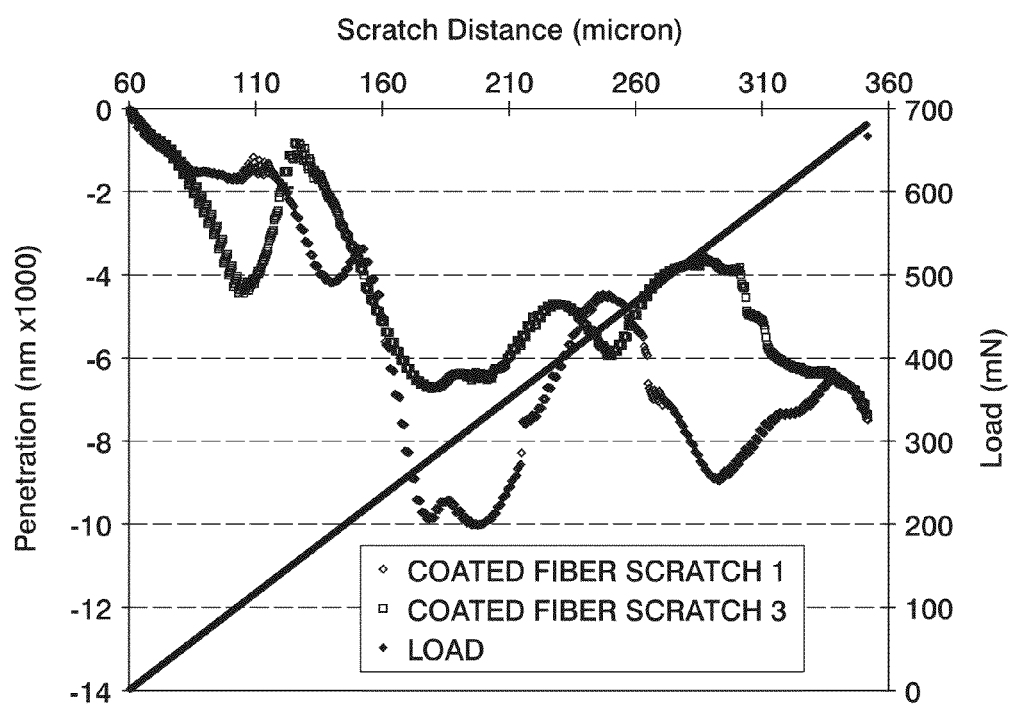
FIG. 14 is a graph showing the relationship between scratch length and both penetration depth and load for the sample shown in FIG. 13.
Figure 15:
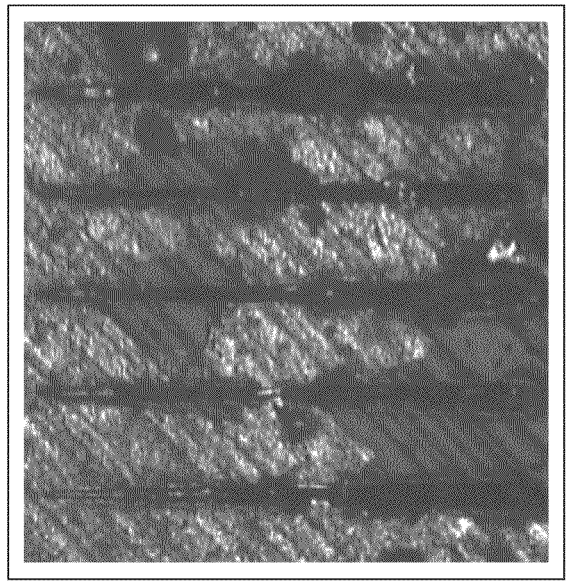
FIG. 15 is a photomicrograph showing a scratch across a copper plated epoxy puck subjected to adhesion testing.
Figure 16:
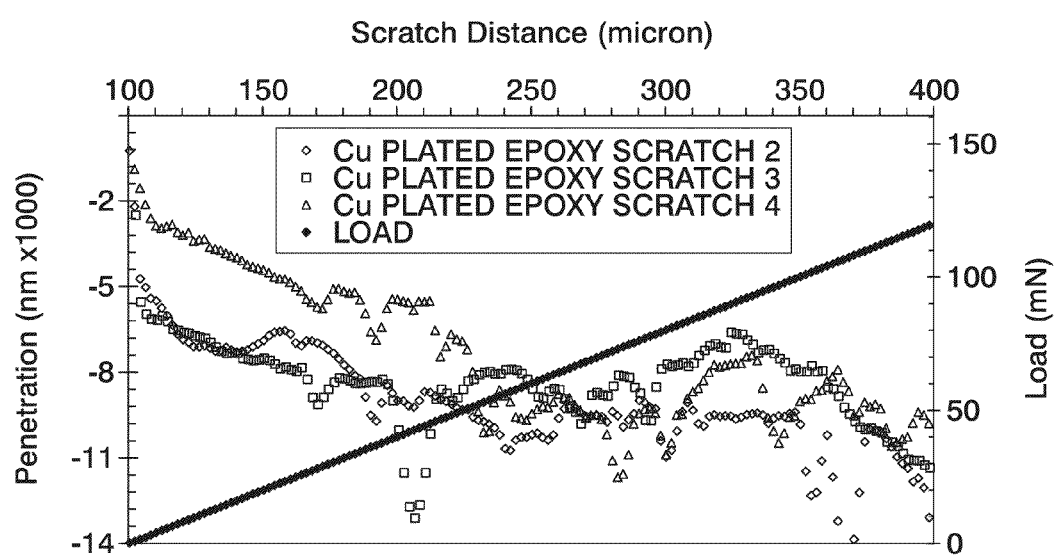
FIG. 16 is a graph showing the relationship between scratch length and both penetration depth and load for the sample shown in FIG. 15.

A set of copper plated metal parts consisting of metal plates, copper-plated epoxy pucks and copper plated carbon fibers were measured to establish the degree of adhesion of the copper to these substrates. A total of three copper plated substrates were tested for adhesion by scratching the surface using an atomic force microscope (AFM) and a conical 2 micron tip at increasing load up to a maximum load of either 200 mN or 700 mN where the latter is the maximum load that this particular instrument can generate. The load at which the film delaminates during this scratch process is referred to as the critical load. It is accompanied by a load excursion in the load vs. scratch length curve. Images of the scratch around that area typically show large blisters of the delaminated film. FIGS. 11, 13 and 15 show the scratches on the copper plated metal, copper plated composite fiber and copper plated epoxy puck, respectively. FIGS. 12, 14 and 16 are graphs showing adhesion results for the copper plated metal, copper plated composite fiber and copper plated epoxy puck, respectively. The results are summarized below:
Copper plated metal plate
AFM conditions: tip scan speed=10 microns/second, scratch length=500 microns, max load=700 mN
Results: No delamination observed
Copper plated carbon composite fiber containing Pd.
AFM conditions: tip scan speed=2 microns/second, scratch length=300 microns, max load=700 mN
Results: No delamination observed
Copper plated epoxy pucks (without metal plating catalyst)
AFM conditions: tip scan speed=10 microns/second, scratch length=500 microns, max load=200 mN
Results: Delamination observed in the range of 34-40 mN
Not having the metal plating catalyst as part of their formulation, the copper plating layer upon the epoxy pucks was easily delaminated at a critical load ranging from 34-40 mN with large delamination sites visible in the optical microscope, images and scratch curves as shown in FIG. 15.

PROPHETIC EXAMPLE 8

Preparation of and Plating on Composite of Polyester and Carbon Fiber

Polyesters represent a category of polymers which contain ester functional groups and can be prepared in either thermosetting or thermosetting or thermoplastic varieties. Liquid thermosetting polyesters can be used for, for example liquid resin casting and where cross-linking is performed through an exothermic reaction involving an organic peroxide, such as methyl ethyl ketone peroxide, butanone peroxide, or benzoyl peroxide. A thermosetting polyester in liquid form is combined with the same carbon fiber filler and palladium salt as were used in Example 1B above in an amount of 10 wt % resin, 90 wt % carbon fiber and 200 ppm palladium salt in a solvent that dissolves the resin and palladium salt. A suitable peroxide crosslinking agent is added to the liquid mixture. The mixture is shaped by pouring and compacting into a mold and once the solvent evaporated, the composition solidified to form a component having the same configuration as the component of Example 1B above. The component is metal plated under the same conditions as were used in Example 1B above. The resulting component has a strongly adherent metal plate layer with adhesion strength of at least 100 mN.

PROPHETIC EXAMPLE 9

Preparation of and Plating on Composite of Polystyrene and Carbon Fiber

A polystyrene resin, a thermoplastic polymer was combined with a solvent (such as 50% toluene/25% acetone/25% methylisobutylketone) to create a liquid solution that is then combined with the same carbon fiber filler and palladium salt as were used in Example 1B above in an amount of 10 wt % resin, 90 wt % fiber and 200 ppm palladium salt. The mixture is shaped, dried, and solidified to form a component having the same configuration as the component of Example 1B above. The component is metal plated under the same conditions as were used in Example 1B above. The resulting component has a strongly adherent, continuous metal plate layer with an adhesion strength of at least 100 mN.

PROPHETIC EXAMPLE 10

Preparation of and Plating on Composite of Polyester and Fiberglass Filaments

The polyester resin in liquid form from Example 8 is combined with a crosslinking agent and a fiberglass filler consisting of chopped lengths of fiberglass filaments, along with the same palladium salt as was used in Prophetic Example 8 above in an amount of 10 wt % resin, 90 wt % filaments and 400 ppm palladium salt in a solvent that dissolves the resin, crosslinking catalyst, and palladium salt. The mixture is shaped and solidified to form a component having the same configuration as the component of Example 1 above. The component is metal plated under the same conditions as were used in Example 1 above. The resulting component has a metal plate layer with an adhesion strength of at least 300 mN.

PROPHETIC EXAMPLE 11

Preparation of and Plating on Composite of Elastomeric Fluropolymer and Fiberglass Filaments A suitable fluroelastomer polymer in gum polymer form, such as DuPont Viton® A-100, is combined with a crosslinking agent, such as DuPont Viton® Curative #50 and a carbon fiber filler consisting of chopped lengths of carbon filaments, along with the same palladium salt as was used in Prophetic Example 8 above in an amount of 95 wt % resin, 5 wt % filaments and 400 ppm palladium salt in a solvent of methyl ethyl ketone or another solvent that dissolves the resin, crosslinking catalyst, and enables the palladium salt to be dispersed in the mixture. The mixture is shaped and the solvent is allowed to evaporate. The solidified composite is then cured appropriately to form a rubber-like component having the same configuration as the component of Example 1 above. The component is metal plated under the same conditions as were used in Example 1 above. The resulting component exhibits elastomeric or rubber-like properties and has a strongly adherent metal plate layer with adhesion strength of at least 1.00 mN.

Thus, it is evident that the inclusion of a suitable metal plating catalyst as an additive to a complex, multiple-component bulk composition will enhance the resultant properties of the parts made from the subject composite, including adhesion of at least one surface layer.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims. Unless specifically defined in a specific claim itself, steps or components of the invention should not be implied or imported from any above example as limitations to any particular order, number, position, size, shape, angle, color, or material.

What is claimed is:

1. A method of making a component comprising obtaining a polymeric material, a liquid, a filler and a metal plating catalyst comprising a metal; combining the metal plating catalyst with the polymeric material, liquid, and filler to form a substantially homogeneous mixture; and at least one of evaporating and curing the mixture to form a solidified component.

2. The method of claim 1, wherein, in the solidified component, at least a portion of the metal plating catalyst is anchored to the polymer.

3. The method of claim 1, wherein the metal plating catalyst is obtained by dissolving a metal salt in a liquid containing the polymeric material.

4. The method of claim 1, wherein the liquid is at least one of a solvent and a diluent.

5. The method of claim 1, wherein the metal plating catalyst is at least partially dispersed in the liquid, combined with filler, and dried before being combined with the polymeric material.

6. The method of claim 1, wherein, in the solidified component, at least a portion of the metal plating catalyst is anchored to the filler.

7. The method of claim 1, wherein the obtained metal plating catalyst is in the form of nanoparticles.

8. The method of claim 1, wherein the obtained metal plating catalyst is a metal salt that is combined with a solvent or diluent and subjected to agitation, shear forces and heat to form metal plating catalyst nanoparticles.

9. The method of claim 1, further comprising plating a metal layer on at least a portion of the component.

10. A method of making a component comprising obtaining an epoxy, a crosslinking agent, a carbon filler, a metal plating catalyst, and a liquid comprising at least one of a solvent and a diluent; combining the metal plating catalyst with the epoxy, crosslinking agent, filler and liquid to form a component mixture; and curing the component mixture to form the component.

11. The method of claim 10, wherein the component has an inner portion and an outer surface, further comprising plating a metal layer on at least a portion of the outer surface.

12. The method of claim 11, wherein the component is cut or milled prior to plating of the metal layer.

13. A method of making a component comprising obtaining a thermoset polymeric material, a liquid, a filler and a metal plating catalyst comprising metal-containing nanoparticles; combining the metal plating catalyst with the polymeric material, liquid, and filler to form a substantially homogeneous mixture; and at least one of evaporating and curing the mixture to form a solidified component.

14. The method of claim 13, wherein the metal plating catalyst is present in an amount of about 0.01 to about 5000 ppm based upon the weight of the polymeric material and filler.

15. The method of claim 13, wherein the metal plating catalyst comprises at least one member selected from the group consisting of Pd, Pt, Ni, Co, Cu, Ag, Rh, Ir, Au and blends, alloys, and compounds thereof.

16. The method of claim 13, wherein the metal plating catalyst is obtained by dissolving a metal salt in the liquid.

17. The method of claim 13, wherein the liquid is at least one of a solvent and a diluent.

18. The method of claim 13, wherein, in the solidified component, at least a portion of the metal plating catalyst is anchored to the filler.

19. The method of claim 13, wherein the metal plating catalyst is a metal salt that is combined with a solvent or diluent and subjected to agitation, shear forces and heat to form the metal-containing nanoparticles.

20. The method of claim 13, further comprising plating a metal layer on at least a portion of the component.

* * * * *